(12) United States Patent
Ghosh et al.

(10) Patent No.: US 9,260,031 B2
(45) Date of Patent: Feb. 16, 2016

(54) DISTRIBUTED CHARGING OF ELECTRICAL ASSETS

(71) Applicant: International Business Machines Corporation, Armonk, NY (US)

(72) Inventors: Soumyadip Ghosh, Peekskill, NY (US); Dung Phan, Ossining, NY (US); Mayank Sharma, White Plains, NY (US); Chai Wah Wu, Poughquag, NY (US); Jinjun Xiong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/839,755

(22) Filed: Mar. 15, 2013

(65) Prior Publication Data

US 2014/0266041 A1    Sep. 18, 2014

(51) Int. Cl.
*B60L 11/18* (2006.01)
*G06Q 30/00* (2012.01)
*H02J 3/00* (2006.01)

(52) U.S. Cl.
CPC ........... *B60L 11/1846* (2013.01); *B60L 11/185* (2013.01); *B60L 11/1848* (2013.01); *B60L 11/1861* (2013.01); *G06Q 30/00* (2013.01); *H02J 3/00* (2013.01); *B60L 2240/70* (2013.01); *B60L 2240/80* (2013.01); *Y02T 10/705* (2013.01); *Y02T 10/7005* (2013.01); *Y02T 10/7044* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/169* (2013.01); *Y04S 30/14* (2013.01)

(58) Field of Classification Search
CPC .................................................. B60L 11/1838
USPC ................................. 320/108, 109; 705/2, 22
See application file for complete search history.

(56) References Cited

U.S. PATENT DOCUMENTS

| 2010/0017249 A1* | 1/2010 | Fincham et al. ................... 705/8 |
| 2011/0016063 A1 | 1/2011 | Pollack et al. |
| 2011/0140656 A1 | 6/2011 | Starr et al. |
| 2011/0224841 A1* | 9/2011 | Profitt-Brown et al. .......... 701/2 |
| 2012/0065831 A1 | 3/2012 | Ross et al. |
| 2012/0306437 A1* | 12/2012 | Johnson et al. ............... 320/107 |
| 2013/0035814 A1* | 2/2013 | Boyer et al. ..................... 701/22 |

(Continued)

FOREIGN PATENT DOCUMENTS

| EP | 2404779 A1 | 1/2012 |
| WO | 2012012021 A1 | 1/2012 |

OTHER PUBLICATIONS

Sundstrom, O. et al., "Planning Electric-Drive vehicle charging under Constrained Grid Conditions", IBM Research—Zurich Research Report RZ 3785, Aug. 26, 2010.

(Continued)

*Primary Examiner* — Richard Isla Rodas
*Assistant Examiner* — Dung V Bui
(74) *Attorney, Agent, or Firm* — Scully, Scott, Murphy & Presser, P.C.; Daniel P. Morris, Esq.

(57) ABSTRACT

The present disclosure relates generally to the field of distributed charging of electrical assets. In various examples, distributed charging of electrical assets may be implemented in the form of systems, methods and/or algorithms.

26 Claims, 11 Drawing Sheets

(56) References Cited

U.S. PATENT DOCUMENTS

2013/0204471 A1* 8/2013 O'Connell et al. ............. 701/22
2014/0266041 A1* 9/2014 Ghosh et al. .................. 320/109

OTHER PUBLICATIONS

Mets, K. et al., "Optimizing Smart Energy Control Strategies for Plug-In Hybrid Electric Vehicle Charging", Network Operations and Management Workshops IEEE/IFIP, 2010.

Sundstrom, O. et al., "Optimization Methods to Plan the Charging of Electric Vehicle Fleets", Proc. of Int. Conf. on Control, Communication and Power Engineering, 2010.

Singh et al., "Influence of EV on Grid Power Quality andOptimizing the Charging Schedule to Mitigate Voltage Imbalance and Reduce Power Loss", 14th International Power Electronics and Motion Control Conference, EPE-PEMC, 2010.

* cited by examiner

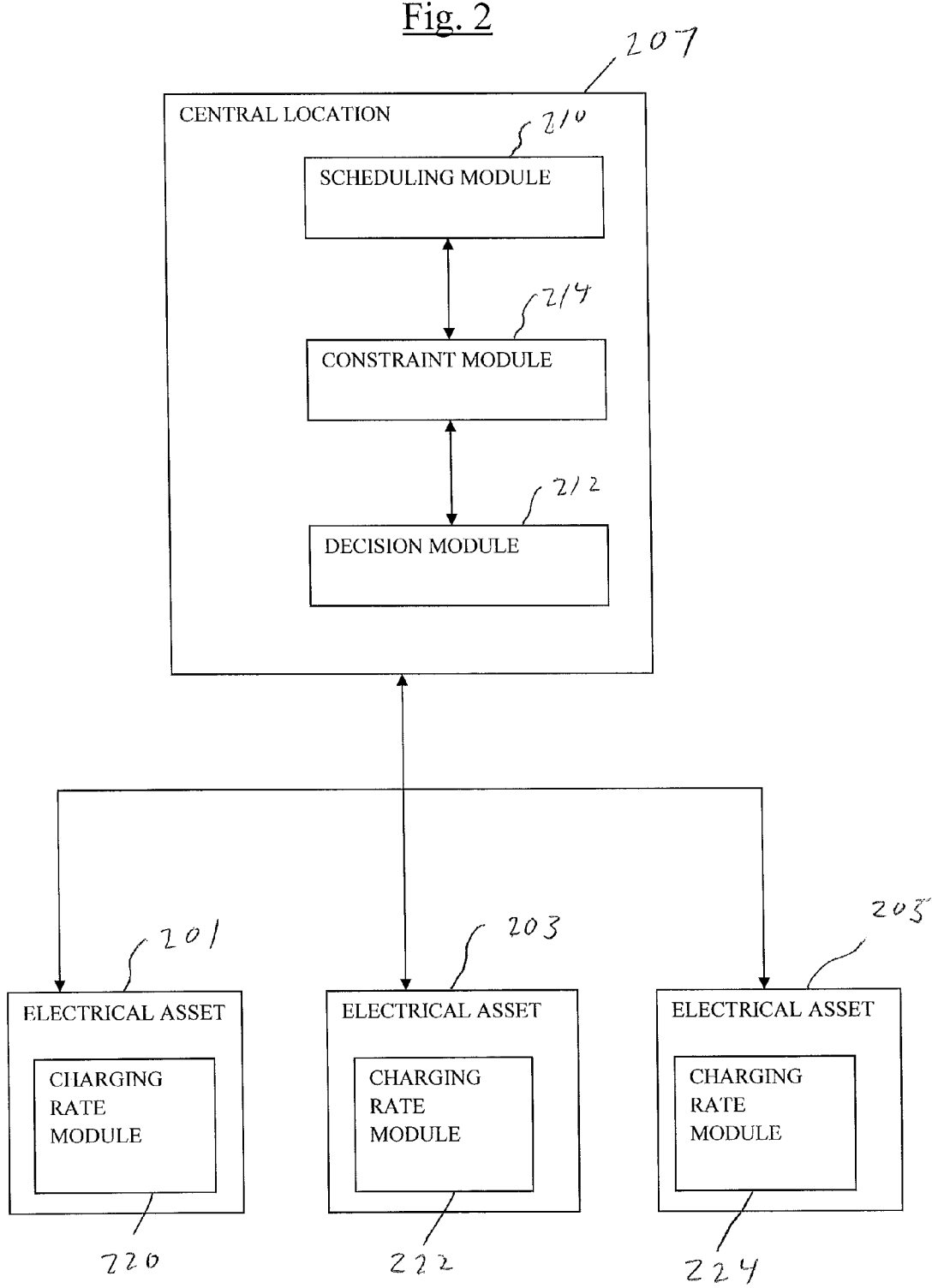

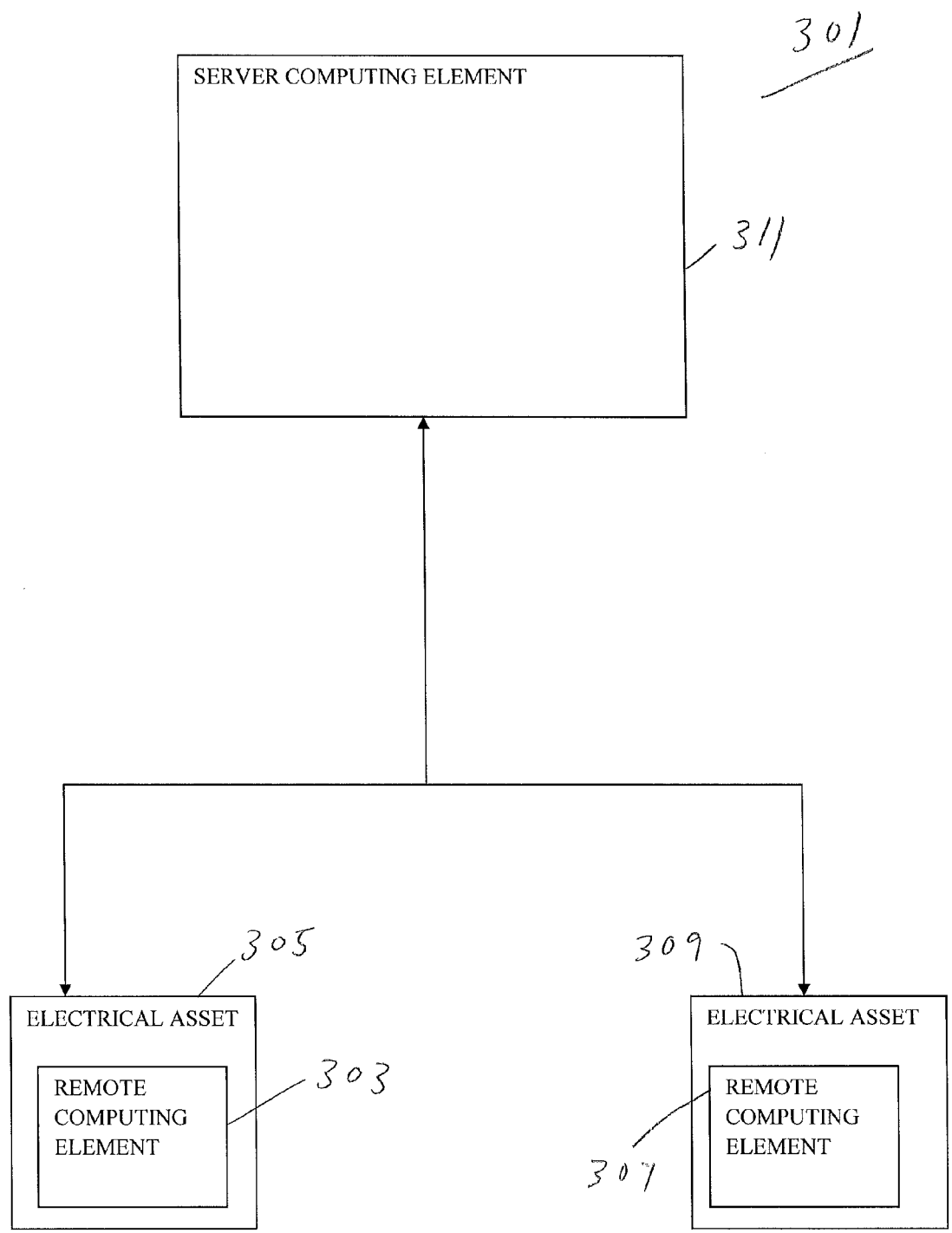

CALCULATING BY THE FIRST REMOTE COMPUTING ELEMENT, BASED AT LEAST IN PART UPON THE INCENTIVE SIGNAL RECEIVED BY THE FIRST REMOTE COMPUTING ELEMENT, A FIRST CHARGING PROFILE (WHEREIN THE CALCULATION OF THE FIRST CHARGING PROFILE IS BASED AT LEAST IN PART UPON THE DISCRETE CHARGING STATES OF THE FIRST ELECTRICAL ASSET)

↓ /409

CALCULATING BY THE SECOND REMOTE COMPUTING ELEMENT, BASED AT LEAST IN PART UPON THE INCENTIVE SIGNAL RECEIVED BY THE SECOND REMOTE COMPUTING ELEMENT, A SECOND CHARGING PROFILE (WHEREIN THE CALCULATION OF THE SECOND CHARGING PROFILE IS BASED AT LEAST IN PART UPON THE DISCRETE CHARGING STATES OF THE SECOND ELECTRICAL ASSET)

↓ /411

CHARGING BY THE FIRST REMOTE COMPUTING ELEMENT THE FIRST ELECTRICAL ASSET ACCORDING TO THE FIRST CHARGING PROFILE

↓ /413

CHARGING BY THE SECOND REMOTE COMPUTING ELEMENT THE SECOND ELECTRICAL ASSET ACCORDING TO THE SECOND CHARGING PROFILE

415
RECEIVING BY THE FIRST SERVER COMPUTING ELEMENT FROM THE FIRST REMOTE COMPUTING ELEMENT THE FIRST CHARGING PROFILE

417
RECEIVING BY FIRST SERVER COMPUTING ELEMENT FROM THE SECOND REMOTE COMPUTING ELEMENT THE SECOND CHARGING PROFILE

419
GENERATING BY THE FIRST SERVER COMPUTING ELEMENT AT LEAST ONE MODIFIED INCENTIVE SIGNAL BASED AT LEAST IN PART UPON AT LEAST ONE OF THE FIRST CHARGING PROFILE AND THE SECOND CHARGING PROFILE

421
SENDING BY THE FIRST SERVER COMPUTING ELEMENT TO THE FIRST REMOTE COMPUTING ELEMENT AT LEAST ONE MODIFIED INCENTIVE SIGNAL

423
SENDING BY THE FIRST SERVER COMPUTING ELEMENT TO THE SECOND REMOTE COMPUTING ELEMENT AT LEAST ONE MODIFIED INCENTIVE SIGNAL

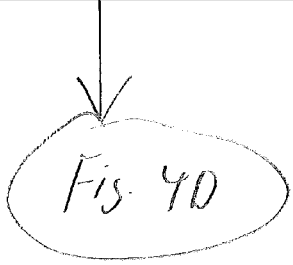

FIG. 4D

425
CALCULATING BY THE FIRST REMOTE COMPUTING ELEMENT, BASED AT LEAST IN PART UPON THE MODIFIED INCENTIVE SIGNAL, A FIRST MODIFIED CHARGING PROFILE

427
CALCULATING BY THE SECOND REMOTE COMPUTING ELEMENT, BASED AT LEAST IN PART UPON THE MODIFIED INCENTIVE SIGNAL, A SECOND MODIFIED CHARGING PROFILE

429
CHARGING BY THE FIRST REMOTE COMPUTING ELEMENT THE FIRST ELECTRICAL ASSET ACCORDING TO THE FIRST MODIFIED CHARGING PROFILE

431
CHARGING BY THE SECOND REMOTE COMPUTING ELEMENT THE SECOND ELECTRICAL ASSET ACCORDING TO THE SECOND MODIFIED CHARGING PROFILE

Fig. 6

Algorithm 1 : Distributed algorithm for charging of electrical assets given : $\alpha \geq 0, \delta_1 > 0, \delta_2 > 1$
initialize: $z_n^0 = (f^{n,0}, l^{n,0}, S^{n,0})$
for $i = 0, 1, \ldots$ do
    step $i1$:
    given : $\mu_{max} > 0, \nu > 1, 0 < \tau < 1$
    initialize: $z_n^{i,0} = z_n^i$
    for $j = 0, 1, \ldots$ do
        step $j1$:
        given : $\eta > 1, 0 < \sigma < 1, M > 0, \gamma_0 \in [\gamma_{\min}, \gamma_{\max}] \subset (0, \infty)$
        initialize: $z_n^{i,j,0} = z_n^{i,j}$
        for $k = 0, 1, \ldots$ do
            step $k1$: Set $\phi_R^k = \max\{\ell(z^{i,j,k-p}, \mu^j, \rho, \alpha^i) : 0 \leq p < \min(k, M)\}$
            step $k2$: Set $\gamma_k = \eta^m \gamma_0$, where $m \geq 0$ is the smallest integer such that
                $\ell(z^{i,j,k+1}, \mu^j, \rho, \alpha^i) \leq \phi_k^R - \sigma \gamma_k \|z^{i,j,k+1} - z^{i,j,k}\|^2$
            where $z^{i,j,k+1}$ solves $$\min \nabla h_n(x^{i,j,k})(x_n - x_n^{i,j,k}) + \frac{\gamma_k}{2}\|x_n - x_n^{i,j,k}\|^2 + \beta_n(S^n)^2$$
$$\text{s.t } z_n^{i,j} \in \Omega_n$$

step $k3$: Let $\gamma_0 = \min(\gamma_{\max}, \max(\gamma_{\min}, \gamma_{BB}))$, where $\gamma_{BB} = \frac{(s^k)^T r^k}{\|r^k\|^2}$,
            $s^k = z^{i,j,k+1} - z^{i,j,k}, r^k = \nabla h(x^{i,j,k+1}) - \nabla h(x^{i,j,k})$
            step $k4$: If $\|s^k\| \leq \epsilon$, terminate the $k$ loop; otherwise set $k = k + 1$
        Set $z^{i,j+1} = z^{i,j,k+1}$
        step $j2$: Set $g_t = \sum_{n=1}^N (R^n f_t^{n,i,j+1} + r^n l_t^{n,i,j+1}) - C + B_t$ and $V_t^j = \max\{g_t, -\frac{\mu_t^j}{\rho}\}$
        step $j3$: If $j > 0$ and $\|V^j\| > \tau \|V^{j-1}\|$ then $\rho = \nu \rho$
        step $j4$: Update $\mu_t^{j+1} = \min\{\max\{0, \mu_t^j + \rho g_t\}, \mu_{max}\} \forall t = 1, \ldots, T$
        step $j5$: If $\|z^{i,j+1} - z^{i,j}\| \leq \epsilon$, terminate the $j$ loop; otherwise set $j = j + 1$
    Set $z^{i+1} = z^{i,j+1}$
    step $i2$: If $\|z^{i+1} - z^i\| \leq \epsilon$, terminate the $i$ loop
    step $i3$: If $i = 1$ set $\alpha^{i+1} = \alpha^i + \delta_1$; otherwise set $\alpha^{i+1} = \alpha^i \delta_2$. Set $i = i + 1$
output : $f^n, l^n, S^n \ \forall n \in 1, \ldots, N$

Fig. 7

Algorithm 2: Message-passing distributed algorithm initialize: Transformer collects the characteristics of EVs: $R^n, r^n$, plugging in and leaving times $T_1^n, T_2^n$. It calculates time interval $T$ and sets values for
$\mathbf{z}_n^0 = (\mathbf{f}^{n,0}, \mathbf{l}^{n,0}, S^{n,0})$, and for parameters
$\alpha \geq 0, \delta_1 > 0, \delta_2 > 1, \mu_{max} > 0, \nu > 1, 0 < \tau < 1, \eta > 1, 0 < \sigma < 1, M > 0$ for $i = 0, 1, \ldots$ do step $i1$:
Transformer receives feedback signals $\mathbf{z}_n^i = (\mathbf{f}^{n,i}, \mathbf{l}^{n,i}, S^{n,i})$ and initializes $\mathbf{z}_n^{i,0} = \mathbf{z}_n^i$ for $j = 0, 1, \ldots$ do step $j1$:
Transformer receives feedback signals $\mathbf{z}_n^{i,j} = (\mathbf{f}^{n,i,j}, \mathbf{l}^{n,i,j}, S^{n,i,j})$ and initializes
$\mathbf{z}_n^{i,j,0} = \mathbf{z}_n^{i,j}, \gamma_0 \in [\gamma_{min}, \gamma_{max}]$ for $k = 0, 1, \ldots$ do step $k1$: Transformer computes
$\phi_R^k = \max\{\ell(\mathbf{z}^{i,j,k-p}, \mu^j, \rho, \alpha^i) : 0 \leq p < \min(k, M)\}$ step $k2$:

for $m = 1, \ldots$ do

• Transformer computes $\gamma_k = \eta^m \gamma_0$ and sends the incentive signal
$\left(B_t + \sum_{n=1}^N (R^n f_t^{n,i,j,k} + r^n l_t^{n,i,j,k}), (C - B_t + \sum_{n=1}^N (R^n f_t^{n,i,j,k} + r^n l_t^{n,i,j,k}) + \frac{\mu_t^j}{\rho})_+, \gamma_k, \alpha^i\right) : t = 1, \ldots, T$ to every EV

• Each EV receives the incentive signal, then computes $h_n(\mathbf{x}^{i,j,k})$ so as to solve its own optimization problem to get the charging profile $\mathbf{x}_n^{i,j,k+1}$ and unsatisfied demand $S^{n,i,j,k+1}$ $$\min \nabla h_n(\mathbf{x}^{i,j,k})(\mathbf{x}_n - \mathbf{x}_n^{i,j,k}) + \frac{\gamma_k}{2}\|\mathbf{x}_n - \mathbf{x}_n^{i,j,k}\|^2 + \beta_n(S^n)^2$$
$$\text{s.t } \mathbf{z}_n^{i,j} \in \Omega_n$$

• Each EV sends its feedback signal
$\mathbf{z}_n^{i,j,k+1} = (\mathbf{f}^{n,i,j,k+1}, \mathbf{l}^{n,i,j,k+1}, S^{n,i,j,k+1})$

• Transformer checks the stopping condition
$\ell(\mathbf{z}^{i,j,k+1}, \mu^j, \rho, \alpha^i) \leq \phi_k^R - \sigma\gamma_k\|\mathbf{z}^{i,j,k+1} - \mathbf{z}^{i,j,k}\|^2$ step $k3$: Transformer computes $\gamma_0 = \min(\gamma_{max}, \max(\gamma_{min}, \gamma_{BB}))$, where
$\gamma_{BB} = \frac{(\mathbf{s}^k)^T \mathbf{r}^k}{\|\mathbf{r}^k\|^2}, \mathbf{s}^k = \mathbf{z}^{i,j,k+1} - \mathbf{z}^{i,j,k}, \mathbf{r}^k = \nabla h(\mathbf{x}^{i,j,k+1}) - \nabla h(\mathbf{x}^{i,j,k})$ step $k4$: Transformer checks the stopping condition $\|\mathbf{s}^k\| \leq \epsilon$. If it is satisfied, transformer updates $\mathbf{z}^{i,j+1} = \mathbf{z}^{i,j,k+1}$ and terminates the $m$ loop; set $k = k+1$ Transformer does the following steps $j2 - j5$:

step $j2$: Set $g_t = \sum_{n=1}^N (R^n f_t^{n,i,j+1} + r^n l_t^{n,i,j+1}) - C + B_t$ and $V_t^j = \max\{g_t, -\frac{\mu_t^j}{\rho}\}$ step $j3$: If $j > 0$ and $\|\mathbf{V}^j\| > \tau\|\mathbf{V}^{j-1}\|$ then $\rho = \nu\rho$ step $j4$: Update $\mu_t^{j+1} = \min\{\max\{0, \mu_t^j + \rho g_t\}, \mu_{max}\} \; \forall t = 1, \ldots, T$ step $j5$: If $\|\mathbf{z}^{i,j+1} - \mathbf{z}^{i,j}\| \leq \epsilon$, update $\mathbf{z}^{i+1} = \mathbf{z}^{i,j+1}$ and terminate the $j$ loop; otherwise set $j = j + 1$ step $i2$: Transformer checks the stopping condition $\|\mathbf{z}^{i+1} - \mathbf{z}^i\| \leq \epsilon$, if it is satisfied, sends a algorithm termination signal and each EV starts to charge using the final charging profile step $i3$: Transformer checks $i = 1$ it sets $\alpha^{i+1} = \alpha^i + \delta_1$; otherwise it sets $\alpha^{i+1} = \alpha^i \delta_2$. It sets $i = i + 1$ $$\left\{ \left( B_t + \sum_{n=1}^{N}(R^n f_t^n + r^n l_t^n), \left( C - B_t + \sum_{n=1}^{N}(R^n f_t^n + r^n l_t^n) + \frac{u_t}{p} \right)_+, \gamma, \alpha \right) : t = 1, \ldots, T \right\}$$

Fig. 8

DISTRIBUTED CHARGING OF ELECTRICAL ASSETS

This invention was made with Government support under Contract No.: DE-OE0000190 (awarded by Department of Energy (DOE)). The Government has certain rights in this invention.

BACKGROUND

The present disclosure relates generally to the field of distributed charging of electrical assets.

In various examples, distributed charging of electrical assets may be implemented in the form of systems, methods and/or algorithms.

DESCRIPTION OF RELATED ART

There is growing interests in utilizing hybrid and/or electrical vehicles (sometimes referred to herein collectively as electrical vehicles or "EVs") at residential homes. However, charging these EVs in a community will typically impose tremendous burden to the substation/transformer that provides power to the community. Further, the problem will typically become even more severe if many or all EVs are charging at the same time (e.g., in the evening when the base load consumption is also typically high). Conventional centralized ways of determining charging schedules for all EVs are typically not practical.

One conventional practice is to have each EV independently determine, ad hoc, its own charging schedule. However, it is believed that such an ad hoc way of determining charging schedules will not be sustainable/scalable as the number of EVs continues to increase in the future (for example, such an ad hoc way of determining charging schedules may over-burden the substation/transformer and possibly even cause the substation/transformer to malfunction and/or go offline).

Another conventional practice is to use continuous formulations (or continuous relaxations) to approximate the real-world discrete situations. However, such converting the continuous solutions to discrete ones is typically problematic from a practical point of view.

Other shortcomings of the conventional practices include the following: there is typically no capacity constraint; the plug-in/leaving time (that is charging start time and charging end time) is the same (or close to the same) for many or all EVs in a given community; and/or there is limited distributed functionality.

SUMMARY

The present disclosure relates generally to the field of distributed charging of electrical assets.

In various examples, distributed charging of electrical assets may be implemented in the form of systems, methods and/or algorithms.

In one embodiment, a computer-implemented system for distributed charging of at least one electrical asset is provided, wherein each electrical asset has associated therewith a plurality of discrete charging states, the system comprising: a first remote computing element, wherein the first remote computing element is associated with a first one of the at least one electrical assets; and a first server computing element in operative communication with the first remote computing element; wherein the first server computing element is configured to send to the first remote computing element at least one incentive signal; wherein the first remote computing element is configured to calculate, based at least in part upon the incentive signal, a first charging profile; and wherein the calculation of the first charging profile is based at least in part upon the discrete charging states of the first electrical asset.

In another embodiment, a computer readable storage medium, tangibly embodying a program of instructions executable by the computer for distributed charging of at least one electrical asset is provided, wherein each electrical asset has associated therewith a plurality of discrete charging states, the program of instructions, when executing, performing the following steps: sending from a first server computing element to a first remote computing element associated with a first one of the at least one electrical assets at least one incentive signal; and calculating by the first remote computing element, based at least in part upon the incentive signal received by the first remote computing element, a first charging profile; wherein the calculation of the first charging profile is based at least in part upon the discrete charging states of the first electrical asset.

In another embodiment, a method implemented in a computer system for distributed charging of at least one electrical asset is provided, wherein each of the at least one electrical assets has associated therewith a plurality of discrete charging states, the method comprising: sending from a first server computing element to a first remote computing element associated with a first one of the at least one electrical assets at least one incentive signal; and calculating by the first remote computing element, based at least in part upon the incentive signal received by the first remote computing element, a first charging profile; wherein the calculation of the first charging profile is based at least in part upon the discrete charging states of the first electrical asset.

BRIEF DESCRIPTION OF THE DRAWINGS

Various objects, features and advantages of the present invention will become apparent to one skilled in the art, in view of the following detailed description taken in combination with the attached drawings, in which:

FIG. 2 depicts a block diagram of a system according to an embodiment of the present invention.

FIG. 3 depicts a block diagram of a system according to an embodiment of the present invention.

FIGS. 4A-4D depict a flowchart of a method according to an embodiment of the present invention.

FIG. 6 depicts an algorithm according to an embodiment of the present invention.

FIG. 7 depicts an algorithm according to an embodiment of the present invention.

FIG. 8 depicts a formula that defines the incentive signal sent from the transformer in connection with the algorithms of FIGS. 6 and 7.

DETAILED DESCRIPTION

Figure 1:
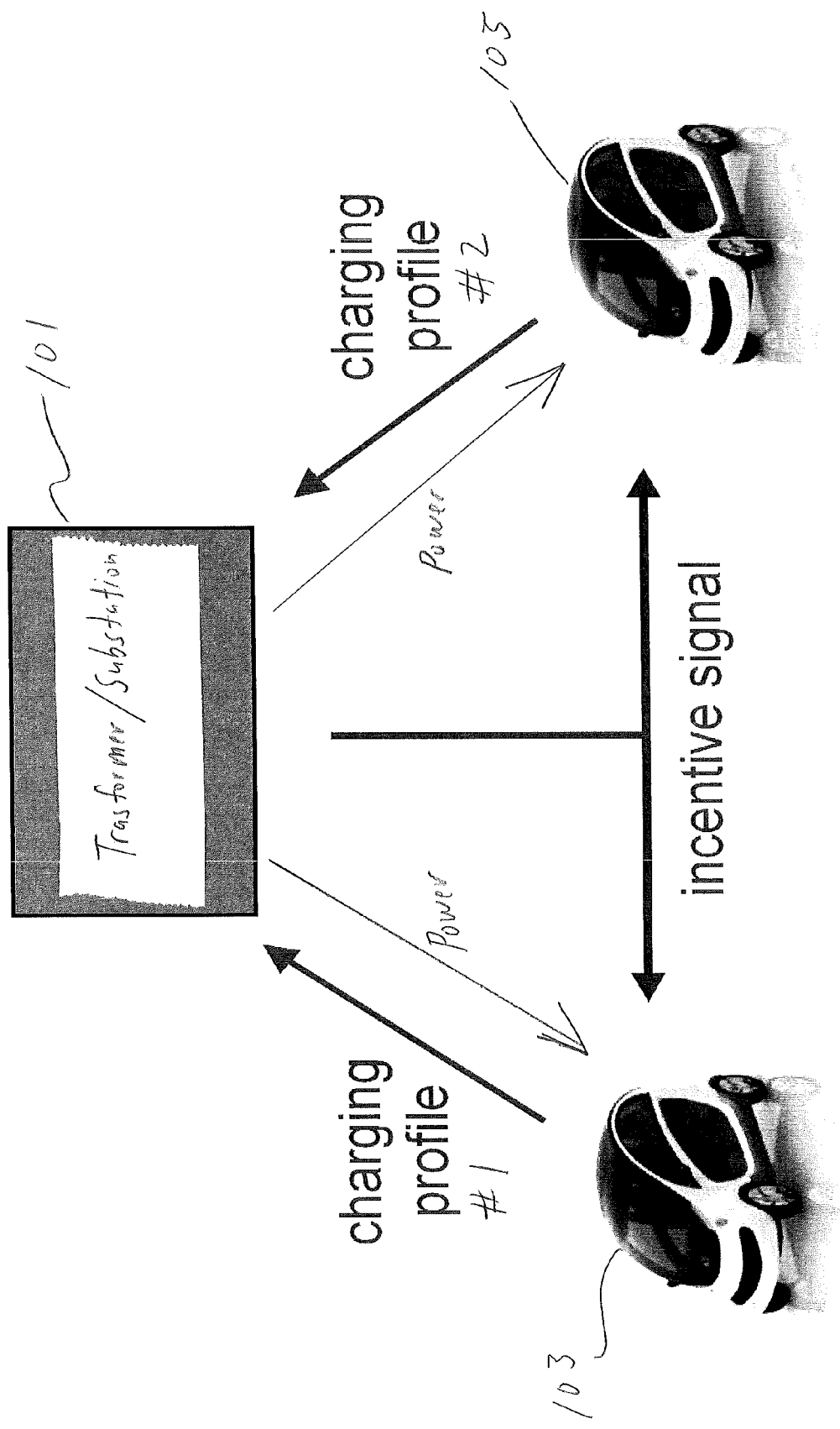
FIG. 1 depicts a block diagram of a system according to an embodiment of the present invention.
Figure 4A:
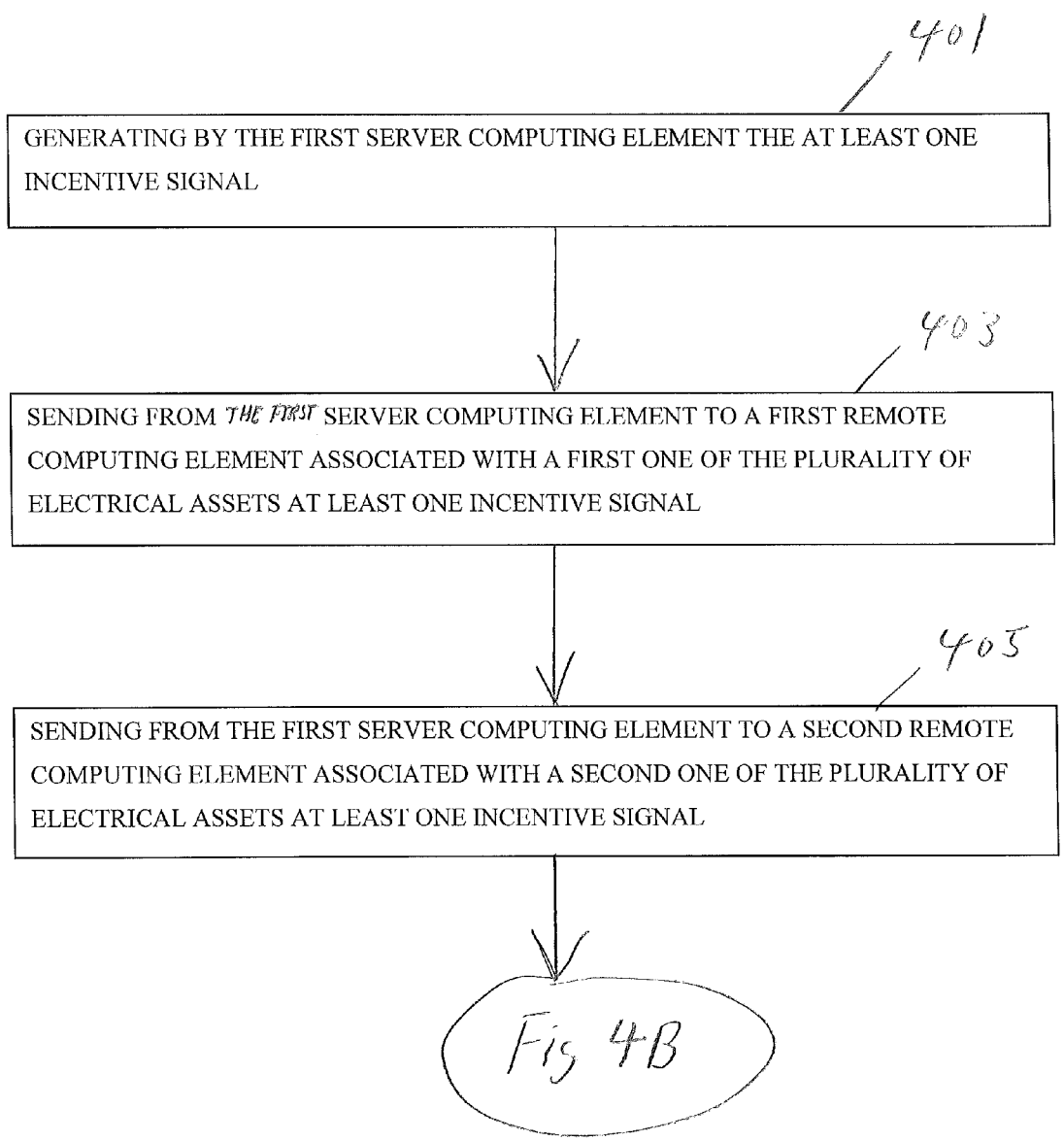

A paper entitled "A Distributed Scheme For Fair EV Charging Under Transmission Constraints" by Phan et al. was presented Jun. 27-29, 2012 at the American Control Conference. The disclosure of this paper is incorporated herein by reference in its entirety.

For the purposes of description the term "real-time" is intended to refer to cause and effect occurring approximately contemporaneously in time (e.g., without significant time lag between cause and effect but not necessarily instantaneously).

For the purposes of description, the term "historic" is intended to refer to past events.

For the purposes of description, the term "EV" is intended to refer to an electric vehicle including (but not limited to): a fully electric vehicle or a hybrid electric vehicle.

For the purposes of description, the term "electrical asset" is intended to refer to any device having a battery for receiving and storing an electrical charge. Various examples of such electrical assets include (but are not limited to): vehicles (e.g., EVs), appliances, batteries.

For the purposes of description, the term "scalable" is intended to refer to a complexity of an implementation of an algorithm having essentially a manageable dependence on the number of controllable electrical assets.

For the purposes of description, the term "fairness" is intended to refer to no subset of users or electrical assets being disproportionately subject to curtailed charging schedules.

For the purposes of description, the term "social cost" is intended to refer to e.g. monetary cost due to outages and power disruption.

As described herein, mechanisms are provided for determining (e.g., optimally determining) electricity charging schedules. In one example, various electrical assets may be charged using schedules determined via mathematical formulations of a cost minimization problem (e.g., to achieve fairness of charging as well as stable operation of a central location (e.g., substation and/or transformer). In another example, a system may include one or more modules to implement one or more algorithms for solving this problem (i.e., cost minimization problem) in a distributed manner.

Reference will now be made to an example methodology according to an embodiment. In this example, a central location (e.g., a transformer and/or a substation) sends an incentive signal to all electrical assets. Each electrical asset receives the incentive signal from the central location and each electrical asset independently determines its charging schedule. Then, based upon the respective independently determined charging schedule, each electrical asset sends one or more signals (feedback signals) back to the central location (in one example, the signal(s) sent back to the central location are the charging schedules themselves). The central location then collects the feedback signals from all electrical assets. In various examples, the incentive signals and feedback signals may be generated and transmitted in an iterative process. By operating in this manner, the central location and the electrical assets collectively (e.g., through information exchanges) reach a charging solution.

In one specific example, the charging solution may be an optimal solution that minimizes the total "social cost". In another specific example, the solution may be modeled as follows: (a cost of supplying energy)+(a cost of over-capacity limit load for the transformer and/or a substation).

Referring now to FIG. 1, an example of distributed charging of electrical assets according to one embodiment is show. As seen in this FIG. 1, power source 101 (which may be, for example, a transformer and/or a substation) supplies power to a number of electrical assets (in this example, EVs 103, 105). Of course, while two EVs are shown in this example, any desired number of EVs may be supported. In addition, power source 101 includes one or more computer servers or the like (not shown). As described in more detail herein, the computer server(s) of power source 101 send various data to EVs 103, 105 and receive various data from EVs 103, 105. Further, each EV may have associated therewith a respective charging station or the like (not shown) for receiving information and/or power from the power source and for sending information to the power source.

Still referring to FIG. 1, in this example, one transformer/substation communicates with a number of EVs (and/or charge stations). In other examples, multiple transformers/substations communicate with a number of EVs (and/or charge stations). Further, in this example, information only flows between the transformer/substation and each EV, but not among EVs. In other examples, information may flow among EVs.

Still referring to FIG. 1, in this example, power source 101 has a fixed real power supply capacity limit (KW). Further, each EV has the following: (a) a charge capacity Bi (KWH) (in one example, some or all of the EVs may have different charge capacities); (b) an allowable time for charging—e.g., "I need the car by 8 AM tomorrow morning" (in one example, some or all of the EV may have different allowable times for charging); (c) a state-of-charge at the time of request Si (%) (in one example, some or all of the EV may have different state-of-charge at the time of request); (d) a required charge $Ei=Bi*(1-Si)$; and (e) two modes of charging—fast mode vs. slow mode (in another example, more than two modes of charging rates (e.g., fast, medium and slow) may be supported).

Still referring to FIG. 1, an example distributed algorithm operation may be as follows: (1) Power source 101 generates an initial incentive signal (e.g., based on historical load(s) and/or forecast load(s)) and sends the incentive signal to each of EV 103 and EV 105 (in one example, each EV may receive the same incentive signal; in another example, one or more EVs may receive a different incentive signal from one or more other EVs); (2) While iteration<K or converged: (a) Each EV sends its respective charging profile (see charging profile #1 and charging profile #2) as feedback signals to the power source 101; (b) Power source 101 aggregates the loads, solves the optimization (based at least in part upon the feedback signals) and adjusts its subsequent incentive signal(s) as necessary; (c) Power source 101 sends the adjusted incentive signals(s) to all EVs through e.g. smart metering infrastructure, wireless communication and/or broadband over power lines; and (d) Additional iteration(s) starting at (a) above are carried out; (3) Each EV starts to charge based on its final charging profile. The final charging profile is determined by the stopping criteria e.g. when the charging profile is not changing significantly from iteration to iteration.

Still referring to FIG. 1, in one example, a goal may be to minimize the total "social cost" associated with charging each electrical asset. In another example, the load consumption profile should be as flat as possible (e.g., to minimize the probability of substation/transformer malfunction (such as "blow-up"). In one specific example, the distributed charging may be carried out in order to maximize the amount of charge given to all electrical assets (e.g., subject to a strict capacity constraint on the transformer/substation). In another specific example, the distributed charging may be carried out in order to minimize any extra energy purchase from a spot market as needed to satisfy all charging needs. In another specific example, the distributed charging may be carried out in order to maximize total fair charging to all electrical assets under a randomization algorithm to utilize available capacity to spread charging in a fair manner. In another specific example, premium spot market purchases as desired by each electrical asset may be provided.

Referring now to FIG. 2, an example of distributed charging of electrical assets according to another embodiment is show. As seen in this FIG. 2, this embodiment provides for charging one or more electrical assets (see electrical assets 201, 203 and 205) that are connected to a central location (see central location 207). In one example, the central location may comprise a transformer and/or a substation. This embodiment includes a scheduling module 210 (located in this example at the central location) to coordinate the charging of the electrical assets (e.g., subject to constraints at both the central location and the electrical assets). Further, this embodiment includes a decentralized decision module 212 (located in this example at the central location) that send signals (e.g., incentive signals) from the central location to the electrical assets and that receives signals (e.g., charging profiles) from the electrical assets. In addition, this embodiment includes a plurality of charging rate modules 220, 222 and 224 (each of which is located in this example at a respective electrical asset). Each of these charging rate modules permits a respective electrical asset to dynamically choose from a discrete set of charging rates (e.g., fast, slow, off; or fast, medium, slow, off).

Still referring to FIG. 2, a constraint module 214 (located in this example at the central location) may be provided. This constraint module may ensure that the goals of the central location's optimization include fairness of charging and/or stable operation of the central location itself.

Still referring to FIG. 2, any communications (e.g., sending/receiving one or more incentive signals, sending/receiving one or more charging profiles) may be carried out via a network. Such a network (which may be wired and/or wireless) may comprise the Internet, an intranet, a local area network, a wide area network and/or any other desired communication channel(s). In another example, some or all of the elements of FIG. 2 may be implemented in a computer system of the type shown in FIG. 5.

Referring now to FIG. 3, a computer-implemented system 301 for distributed charging of a plurality of electrical assets, wherein each of the electrical assets has associated therewith a plurality of discrete charging states is shown. As seen in this FIG. 3, the system 301 may comprise: a first remote computing element 303, wherein the first remote computing element is associated with a first one of the plurality of electrical assets 305; a second remote computing element 307, wherein the second remote computing element is associated with a second one of the plurality of electrical assets 309; and a first server computing element 311 in operative communication with the first remote computing element and the second remote computing element; wherein the first server computing element is configured to send to the first remote computing element at least one incentive signal; wherein the first remote computing element is configured to calculate, based at least in part upon the incentive signal, a first charging profile; wherein the first server computing element is configured to send to the second remote computing element at least one incentive signal; wherein the second remote computing element is configured to calculate, based at least in part upon the incentive signal, a second charging profile; wherein the calculation of the first charging profile (associated with the first electrical asset) is based at least in part upon the discrete charging states of the first electrical asset; and wherein the calculation of the second charging profile (associated with the second electrical asset) is based at least in part upon the discrete charging states of the second electrical asset.

In one example, any steps may be carried out in the order recited or the steps may be carried out in another order.

Still referring to FIG. 3, in one embodiment, any communications (e.g., sending/receiving one or more incentive signals, sending/receiving one or more charging profiles) may be carried out via a network. Such a network may comprise the Internet, an intranet, a local area network, a wide area network and/or any other desired communication channel(s). In another example, some or all of the elements of FIG. 3 may be implemented in a computer system of the type shown in FIG. 5.

Referring now to FIGS. 4A-4D, a method implemented in a computer system for distributed charging of a plurality of electrical assets, wherein each of the electrical assets has associated therewith a plurality of discrete charging states, is shown. As seen in these FIGS. 4A-4D, the method may comprise: at step 401—generating by the first server computing element the at least one incentive signal; at step 403—sending from the first server computing element to a first remote computing element associated with a first one of the plurality of electrical assets at least one incentive signal; at step 405—sending from the first server computing element to a second remote computing element associated with a second one of the plurality of electrical assets at least one incentive signal; at step 407—calculating by the first remote computing element, based at least in part upon the incentive signal received by the first remote computing element, a first charging profile (wherein the calculation of the first charging profile is based at least in part upon the discrete charging states of the first electrical asset); at step 409—calculating by the second remote computing element, based at least in part upon the incentive signal received by the second remote computing element, a second charging profile (wherein the calculation of the second charging profile is based at least in part upon the discrete charging states of the second electrical asset); at step 411—charging by the first remote computing element the first electrical asset according to the first charging profile; and at step 413—charging by the second remote computing element the second electrical asset according to the second charging profile.

In one specific example, the method may stop at step 413 (e.g., such that there is only one iteration). In another specific example, the method may eliminate steps 411 and 413 and not start charging in steps 411 and 413 and instead proceed (from step 409) as follows: at step 415—receiving by the first server computing element from the first remote computing element the first charging profile; at step 417—receiving by the first server computing element from the second remote computing element the second charging profile; at step 419—generating by the first server computing element at least one modified incentive signal based at least in part upon at least one of the first charging profile and the second charging profile; at step 421—sending by the first server computing element to the first remote computing element at least one modified incentive signal; at step 423—sending by the first server computing element to the second remote computing element at least one modified incentive signal; at step 425—calculating by the first remote computing element, based at least in part upon the modified incentive signal, a first modified charging profile; at step 427—calculating by the second remote computing element, based at least in part upon the modified incentive signal, a second modified charging profile; at step 429—charging by the first remote computing element the first electrical asset according to the first modified charging profile; and at step 431—charging by the second remote computing element the second electrical asset according to the second modified charging profile. As described herein, one or more iterations may be carried out.

In another example, any steps may be carried out in the order recited or the steps may be carried out in another order. In another example algorithm, the order in which each EV starts to do the computation does not matter, as long as the communication with the central server is synchronized for each iteration. In another example iterative algorithm (that is, an algorithm containing a loop) the EVs only start to charge once the loop is terminated.

Figure 5:
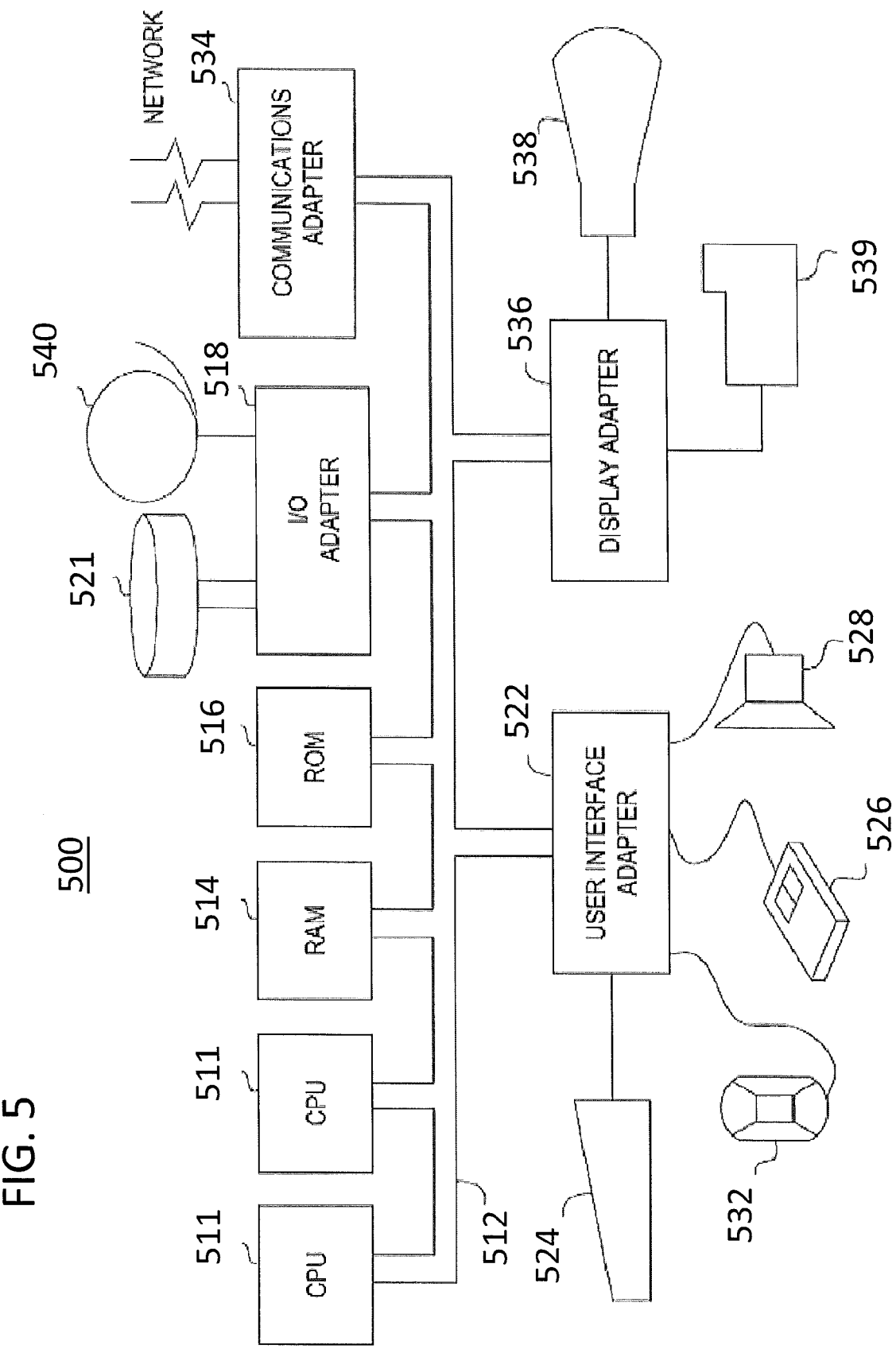
FIG. 5 depicts a block diagram of a system according to an embodiment of the present invention.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an Intranet, a local area network (LAN), etc., and a display adapter 536 for connecting the bus 512 to a display device 538 and/or printer 539 (e.g., a digital printer or the like).

In one embodiment, a computer-implemented system for distributed charging of at least one electrical asset is provided, wherein each electrical asset has associated therewith a plurality of discrete charging states, the system comprising: a first remote computing element, wherein the first remote computing element is associated with a first one of the at least one electrical assets; and a first server computing element in operative communication with the first remote computing element; wherein the first server computing element is configured to send to the first remote computing element at least one incentive signal; wherein the first remote computing element is configured to calculate, based at least in part upon the incentive signal, a first charging profile; and wherein the calculation of the first charging profile is based at least in part upon the discrete charging states of the first electrical asset.

In one example, the system further comprises a second remote computing element, wherein: the second remote computing element is associated with a second one of the at least one electrical assets; wherein the first server computing element is configured to send to the second remote computing element at least one incentive signal; wherein the second remote computing element is configured to calculate, based at least in part upon the incentive signal, a second charging profile; and wherein the calculation of the second charging profile is based at least in part upon the discrete charging states of the second electrical asset.

In another example, the discrete charging states of the first electrical asset are the same as the discrete charging states of the second electrical asset.

In another example, the discrete charging states of the first electrical asset are different from the discrete charging states of the second electrical asset.

In another example, the discrete charging states comprise: off; slow charge; and fast charge.

In another example, the first server computing element is configured to generate the at least one incentive signal.

In another example, the incentive signal sent to the first remote computing element is the same as the incentive signal sent to the second remote computing element.

In another example, the incentive signal sent to the first remote computing element is different from the incentive signal sent to the second remote computing element.

In another example: the first remote computing element is configured to charge the first electrical asset according to the first charging profile; and the second remote computing element is configured to charge the second electrical asset according to the second charging profile.

In another example: first server computing element is configured to receive from the first remote computing element the first charging profile; and first server computing element is configured to receive from the second remote computing element the second charging profile.

In another example, the first server computing element is configured to generate at least one modified incentive signal based at least in part upon at least one of the first charging profile and the second charging profile.

In another example: the first server computing element is configured to send to the first remote computing element at least one modified incentive signal; and the first server computing element is configured to send to the second remote computing element at least one modified incentive signal.

In another example, the modified incentive signal sent to the first remote computing element is the same as the modified incentive signal sent to the second remote computing element.

In another example, the modified incentive signal sent to the first remote computing element is different from the modified incentive signal sent to the second remote computing element.

In another example: the first remote computing element is configured to calculate, based at least in part upon the modified incentive signal, a first modified charging profile; and the second remote computing element is configured to calculate, based at least in part upon the modified incentive signal, a second modified charging profile.

In another example: the first remote computing element is configured to charge the first electrical asset according to the first modified charging profile; and the second remote computing element is configured to charge the second electrical asset according to the second modified charging profile.

In another example, each of the first electrical asset and second electrical asset is an EV.

In another example: the first remote computing element is located at a first location which is different from a location at which the first server computing element is located; and the second remote computing element is located at a second location which is different from the location at which the first server computing element is located.

In another example, the first location is different from the second location.

In another example, the first location is the same as the second location.

In another example: the first charging profile comprises a first charging schedule; and the second charging profile comprises a second charging schedule.

In another example: the first charging schedule comprises an identification of at least one of the discrete charging states at a first specific time or time range; and the second charging schedule comprises an identification of at least one of the discrete charging states at a second specific time or time range.

In another example, each incentive signal comprises information indicative of a cost of electricity as a function of at least one of: (a) a time; and (b) a date.

In another embodiment, a computer readable storage medium, tangibly embodying a program of instructions executable by the computer for distributed charging of at least one electrical asset is provided, wherein each electrical asset has associated therewith a plurality of discrete charging states, the program of instructions, when executing, performing the following steps: sending from a first server computing element to a first remote computing element associated with a first one of the at least one electrical assets at least one incentive signal; and calculating by the first remote computing element, based at least in part upon the incentive signal received by the first remote computing element, a first charging profile; wherein the calculation of the first charging profile is based at least in part upon the discrete charging states of the first electrical asset.

In one example, the program of instructions, when executing performs the following steps: sending from the first server computing element to a second remote computing element associated with a second one of the at least one electrical assets at least one incentive signal; and calculating by the second remote computing element, based at least in part upon the incentive signal received by the second remote computing element, a second charging profile; wherein the calculation of the second charging profile is based at least in part upon the discrete charging states of the second electrical asset.

In another example, the discrete charging states of the first electrical asset are the same as the discrete charging states of the second electrical asset.

In another example, the discrete charging states of the first electrical asset are different from the discrete charging states of the second electrical asset.

In another example, the discrete charging states comprise: off; slow charge; and fast charge.

In another example, the program of instructions, when executing, generates by the first server computing element the at least one incentive signal.

In another example, the incentive signal sent to the first remote computing element is the same as the incentive signal sent to the second remote computing element.

In another example, the incentive signal sent to the first remote computing element is different from the incentive signal sent to the second remote computing element.

In another example, the program of instructions, when executing: charges by the first remote computing element the first electrical asset according to the first charging profile; and charges by the second remote computing element the second electrical asset according to the second charging profile.

In another example, the program of instructions, when executing: receives by the first server computing element from the first remote computing element the first charging profile; and receives by first server computing element from the second remote computing element the second charging profile.

In another example, the program of instructions, when executing, generates by the first server computing element at least one modified incentive signal based at least in part upon at least one of the first charging profile and the second charging profile.

In another example, the program of instructions, when executing: sends by the first server computing element to the first remote computing element at least one modified incentive signal; and sends by the first server computing element to the second remote computing element at least one modified incentive signal.

In another example, the modified incentive signal sent to the first remote computing element is the same as the modified incentive signal sent to the second remote computing element.

In another example, the modified incentive signal sent to the first remote computing element is different from the modified incentive signal sent to the second remote computing element.

In another example, the program of instructions, when executing: calculates by the first remote computing element, based at least in part upon the modified incentive signal, a first modified charging profile; and calculates by the second remote computing element, based at least in part upon the modified incentive signal, a second modified charging profile.

In another example, the program of instructions, when executing: charges by the first remote computing element the first electrical asset according to the first modified charging profile; and charges by the second remote computing element the second electrical asset according to the second modified charging profile.

In another example, each of the first electrical asset and second electrical asset is an EV.

In another example: the first remote computing element is located at a first location which is different from a location at which the first server computing element is located; and the second remote computing element is located at a second location which is different from the location at which the first server computing element is located.

In another example, the first location is different from the second location.

In another example, the first location is the same as the second location.

In another example: the first charging profile comprises a first charging schedule; and the second charging profile comprises a second charging schedule.

In another example: the first charging schedule comprises an identification of at least one of the discrete charging states at a first specific time or time range; and the second charging schedule comprises an identification of at least one of the discrete charging states at a second specific time or time range.

In another example, each incentive signal comprises information indicative of a cost of electricity as a function of at least one of: (a) a time; and (b) a date.

In another embodiment, a method implemented in a computer system for distributed charging of at least one electrical asset is provided, wherein each of the at least one electrical assets has associated therewith a plurality of discrete charging states, the method comprising: sending from a first server computing element to a first remote computing element associated with a first one of the at least one electrical assets at least one incentive signal; and calculating by the first remote computing element, based at least in part upon the incentive signal received by the first remote computing element, a first charging profile; wherein the calculation of the first charging profile is based at least in part upon the discrete charging states of the first electrical asset.

In one example, the method further comprises: sending from the first server computing element to a second remote computing element associated with a second one of the at least one electrical assets at least one incentive signal; and calculating by the second remote computing element, based at least in part upon the incentive signal received by the second remote computing element, a second charging profile; wherein the calculation of the second charging profile is based at least in part upon the discrete charging states of the second electrical asset.

In one example, the discrete charging states of the first electrical asset are the same as the discrete charging states of the second electrical asset.

In another example, the discrete charging states of the first electrical asset are different from the discrete charging states of the second electrical asset.

In another example, the discrete charging states comprise: off; slow charge; and fast charge.

In another example, the method further comprises generating by the first server computing element the at least one incentive signal.

In another example, the incentive signal sent to the first remote computing element is the same as the incentive signal sent to the second remote computing element.

In another example, the incentive signal sent to the first remote computing element is different from the incentive signal sent to the second remote computing element.

In another example, the method further comprises: charging by the first remote computing element the first electrical asset according to the first charging profile; and charging by the second remote computing element the second electrical asset according to the second charging profile.

In another example, the method further comprises: receiving by the first server computing element from the first remote computing element the first charging profile; and receiving by first server computing element from the second remote computing element the second charging profile.

In another example, the method further comprises: generating by the first server computing element at least one modified incentive signal based at least in part upon at least one of the first charging profile and the second charging profile.

In another example, the method further comprises: sending by the first server computing element to the first remote computing element at least one modified incentive signal; and sending by the first server computing element to the second remote computing element at least one modified incentive signal.

In another example, the modified incentive signal sent to the first remote computing element is the same as the modified incentive signal sent to the second remote computing element.

In another example, the modified incentive signal sent to the first remote computing element is different from the modified incentive signal sent to the second remote computing element.

In another example, the method further comprises: calculating by the first remote computing element, based at least in part upon the modified incentive signal, a first modified charging profile; and calculating by the second remote computing element, based at least in part upon the modified incentive signal, a second modified charging profile.

In another example, the method further comprises: charging by the first remote computing element the first electrical asset according to the first modified charging profile; and charging by the second remote computing element the second electrical asset according to the second modified charging profile.

In another example, each of the first electrical asset and second electrical asset is an EV.

In another example: the first remote computing element is located at a first location which is different from a location at which the first server computing element is located; and the second remote computing element is located at a second location which is different from the location at which the first server computing element is located.

In another example, the first location is different from the second location.

In another example, the first location is the same as the second location.

In another example: the first charging profile comprises a first charging schedule; and the second charging profile comprises a second charging schedule.

In another example: the first charging schedule comprises an identification of at least one of the discrete charging states at a first specific time or time range; and the second charging schedule comprises an identification of at least one of the discrete charging states at a second specific time or time range.

In another example, each incentive signal comprises information indicative of a cost of electricity as a function of at least one of: (a) a time; and (b) a date.

As described herein, in one example, each EV may be charged at a desired (e.g., optimal) rate in view of the available energy.

As described herein, in one example, distributed calculation of charging rates and/or times may be provided.

As described herein, in one example, distributed charging rates and/or times may be provided based on "fairness" (e.g., power equality among all vehicles). In one specific example, of "fairness", available energy may be divided according to the storage capacity of each EV (e.g., if EV "A" has a 15 MW storage capacity and EV "B" has a 7 MW storage capacity, then EV "A" may be given a 7.5 MW charge and EV "B" may be given a 3.5 MW charge.

As described herein, in one example, there may be only a few (e.g., 2, 3 or 4) discrete charging rates for each EV (e.g., "off", "low", "medium" and "high") and the charging rates and/or times may be determined based on a discrete formulation (or calculation).

Reference will now be made to a discussion of distributed probabilistic algorithms for charging electric assets according to various embodiments. Such probabilistic algorithms are a particularly effective way in which to implement a distributed system. In an example prototypical probabilistic algorithm, each electrical asset receives an incentive (or control) signal from a central controller, e.g. a transformer or a utility. This incentive signal actuates the electrical asset's charging unit to operate at a randomly chosen charging level based on a probability distribution parameterized by the incentive signal. The value of the incentive signal can be based on several factors such as (but not limited to): for example, local electrical energy supply, energy demand within each planning epoch or time horizon (e.g., each of a plurality of planning epochs or time horizons), the rates for charging at different levels based on local electrical energy supply, the price of electricity on the spot market, the forecast of load in future time epoch(s), and/or the risk profile of the utility. For example, the planning epoch or time horizon could be hourly or every 5 minutes.

In this example, a probabilistic algorithm is implemented in a two-way communication infrastructure where the incentive signal is communicated at regular intervals from a central controller to each electrical asset, and a load/demand signal is communicated from each electrical asset back to the central controller (e.g., at a transformer and/or a utility). Each load/demand signal could convey information such as, for example, the remaining anticipated energy requirement of each respective electrical asset, any preferences with respect to expected charge-by duration and price sensitivity, level of contractual compliance, average service/charging level received up to the current epoch.

Probabilistic algorithms according to various embodiments offer several benefits over other, more conventional, methods (that are based, for example, on static plans or on the solution of a dynamic optimization formulation of the charging problem). Probabilistic algorithms are easier to deploy since they are lightweight (low on state, computational and communication complexity), very well-suited to a distributed implementation, and can be rapidly updated to reflect changes in constraints, forecasts and/or other conditions and objectives.

Another advantage of using probabilistic algorithms is that they provide a natural mechanism for managing demand in the face of constrained supply in a fair and scalable manner.

One specific example of a probabilistic algorithm according to an embodiment is as follows: Consider a system with n electrical assets each requiring $E_i$ kWh, i=1, ... n, total energy to be fully charged over a time horizon consisting of $T_i$ charging intervals or time slots, each of duration $\Delta$ in which decisions will be made. Assume for simplicity that the number of charging slots $T_i$ are equal to T across the asset population. Thus, the charging slot t=1, ..., T refers to the time interval $[(t-1)\Delta, t\Delta]$. Assume that the transformer has a rating of P kVA (or kW); and each plugged in asset can be in one of 3 states: (a) No Charge: no power is drawn; (b) Slow Charge: power drawn is S kW; and (c) Fast Charge: power drawn is F kW.

The load signal from each electrical asset to the controller conveys each electrical asset's remaining energy requirement $E_i(t)$ which is aggregated to obtain the aggregate system $$\text{load } L(t) = \sum_{i=1}^{n} E_i(t).$$

Additionally, each load signal can also convey a forecast or estimate of the respective electrical asset's energy demand in the next few slots.

The incentive signal from the controller, at the transformer or the utility, is assumed in this example to be identical (e.g., because all electrical assets belong to the same contract class), and is defined to be a 4 dimensional vector, I(t), where:

$$I(t) = \begin{bmatrix} p_s(t) \\ c_s(t) \\ p_f(t) \\ c_f(t) \end{bmatrix}$$

Here $p_s(t)$ and $p_f(t)$ are the success probabilities of charging in slow and fast modes, respectively; and $c_s(t)$ and $c_f(t)$ are the corresponding tariffs that an electrical asset would be charged if they were to choose the slow or fast charging mode. The charging probabilities are determined by the controller as the solution to the problem.

Still referring to the 4 dimensional vector above, in one example the controller-side problem is to choose I(t) such that given L(t−1) (the load signal from the previous time slot), the probability that the demand exceeds the transformer rating in that time slot is less than some tolerance $\epsilon$. In another example, an objective could be that instead of trying to minimize the probability of power shortage, the transformer tries to minimize the expected cost of drawing power from an external source (where it is taken as an input an advertised tariff, R(t), at which the external source sells its power in that time slot).

Still referring to the 4 dimensional vector above, in one example, the problem solved by each electrical asset is to choose whether to charge in fast or slow mode, based on the tariffs, the success probabilities and the time until the end of the charging horizon. It is also possible to include in this optimization an explicit user-specific utility function.

Referring now to FIGS. 6 and 7, two example algorithms are shown. More particularly, FIG. 6 shows an example distributed algorithm for charging of electrical assets and FIG. 7 shows an example message-passing distributed algorithm (also for charging of electrical assets). In the algorithm of FIG. 7 the message-passing relations are explicitly written out by using the concepts: incentive signal and feedback signal. In these FIGS. 6 and 7 the following notation is used: $f \triangleq (f^1, \ldots, f^N)$, $1 \triangleq (1^1, \ldots, 1^N)$, $x_n \triangleq (f^n, 1^n)$, $x \triangleq (f, 1)$, $z_n \triangleq (x^n, S^n)$, $z \triangleq (z_1, \ldots, z_N)$, and $V = (V_1, \ldots, V_T)$. The feedback signal from n-EV is $(f^n, 1^n, S^n)$ i.e., the charging profile and unsatisfied demand. The incentive signal sent from the transformer is defined by the formula shown in FIG. 8.

As described herein, mechanisms are provided to determine the information/signals exchanged between a substation/transformer and a plurality of EVs so that a schedule (e.g., an optimal schedule) may be reached while minimizing the cost of having the substation/transformer malfunction (e.g. shut down). In one specific example: the problems are formulated as mixed integer nonlinear programming problems; the optimizations are solved in a decoupled fashion among the substation/transformer and EVs; the substation/transformer collects one or more charging profiles (e.g., one or more optimal charging profiles) from every EV; each EV solves its own charging schedule (e.g., optimal charging schedule) and sends its charging schedule to the central location (e.g., substation/transformer); and the information/signals are the inputs/outputs from these two types of optimization.

As described herein, various embodiments may provide for one or more of the following: (a) taking into account a discrete choice of electrical asset charger setting (e.g., fast, slow, off; fast, medium, slow, off); (b) taking into account a capacity constraint; (c) taking into account plug-in/leaving times (that is charging start times and charging end times) that are different for many electrical assets in given community; (d) distributed functionality (e.g., wherein each electrical asset solves (or contributes to solving) its own optimization problem; and/or (e) the utilization of homotopy, augmented Lagrangian, first-order gradient based methods, and knapsack-type subproblems.

As described herein, demand management may be used to shift demand to off-peak capacity periods (and to minimize a social cost).

As described herein, mechanisms are provided to prevent substation and/or transformer capacity overruns and malfunctions (e.g., blow-ups) by flattening a load consumption profile.

In one example, a methodology may maximize the amount of charge given to all EVs (subject to a strict capacity constraint on the transformer/substation).

In another example, a methodology may minimize any extra energy purchase from a spot market as needed to satisfy all charging needs.

In another example, a methodology may maximize total fair charging to all EVs under a randomization algorithm to utilize available capacity to spread charging in a fair manner, allowing premium spot market purchases as desired by EVs.

As described herein, applications may include (but not be limited to): power engineering, energy and utility (e.g., power industry's operation and planning for EVs).

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer-implemented system for distributed charging of at least one electrical asset, wherein each electrical asset has associated therewith a plurality of discrete charging states, the system comprising:
   a first remote computing element, wherein the first remote computing element is associated with a first one of the at least one electrical assets; and
   a first server computing element in operative communication with the first remote computing element;

wherein the first server computing element is configured to send to the first remote computing element at least one incentive signal;

wherein the first remote computing element is configured to calculate, based at least in part upon the incentive signal, a first charging profile;

wherein the discrete charging states comprise: off; slow charge; and fast charge;

wherein the incentive signal comprises: a success probability associated with the slow charge; a success probability associated with the fast charge; a tariff that the first one of the at least one electrical assets would be charged if the slow charge was chosen; and a tariff that the first one of the at least one electrical assets would be charged if the fast charge was chosen; and wherein the calculation of the first charging profile is a discrete calculation that is based at least in part upon the success probabilities and tariffs of the incentive signal.

2. The system of claim 1, further comprising a second remote computing element, wherein:

the second remote computing element is associated with a second one of the at least one electrical assets;

wherein the first server computing element is configured to send to the second remote computing element at least one incentive signal;

wherein the second remote computing element is configured to calculate, based at least in part upon the incentive signal, a second charging profile; and wherein the calculation of the second charging profile is based at least in part upon the discrete charging states of the second one of the at least one electrical assets.

3. The system of claim 2, wherein the discrete charging states of the first one of the at least one electrical assets are the same as the discrete charging states of the second one of the at least one electrical assets.

4. The system of claim 2, wherein the discrete charging states of the first one of the at least one electrical assets are different from the discrete charging states of the second one of the at least one electrical assets.

5. The system of claim 2, wherein the first server computing element is configured to generate the at least one incentive signal.

6. The system of claim 2, wherein the incentive signal sent to the first remote computing element is the same as the incentive signal sent to the second remote computing element.

7. The system of claim 2, wherein the incentive signal sent to the first remote computing element is different from the incentive signal sent to the second remote computing element.

8. The system of claim 2, wherein:

the first remote computing element is configured to charge the first one of the at least one electrical assets according to the first charging profile; and the second remote computing element is configured to charge the second one of the at least one electrical assets according to the second charging profile.

9. The system of claim 2, wherein:

the first server computing element is configured to receive from the first remote computing element the first charging profile; and the first server computing element is configured to receive from the second remote computing element the second charging profile.

10. The system of claim 9, wherein the first server computing element is configured to generate at least one modified incentive signal based at least in part upon at least one of the first charging profile and the second charging profile.

11. The system of claim 10, wherein:

the first server computing element is configured to send to the first remote computing element at least one modified incentive signal; and the first server computing element is configured to send to the second remote computing element at least one modified incentive signal.

12. The system of claim 11, wherein the modified incentive signal sent to the first remote computing element is the same as the modified incentive signal sent to the second remote computing element.

13. The system of claim 11, wherein the modified incentive signal sent to the first remote computing element is different from the modified incentive signal sent to the second remote computing element.

14. The system of claim 11, wherein:

the first remote computing element is configured to calculate, based at least in part upon the modified incentive signal, a first modified charging profile; and the second remote computing element is configured to calculate, based at least in part upon the modified incentive signal, a second modified charging profile.

15. The system of claim 14, wherein:

the first remote computing element is configured to charge the first one of the at least one electrical assets according to the first modified charging profile; and the second remote computing element is configured to charge the second one of the at least one electrical assets according to the second modified charging profile.

16. The system of claim 2, wherein each of the first one of the at least one electrical assets and second one of the at least one electrical assets is an EV.

17. The system of claim 2, wherein:

the first remote computing element is located at a first location which is different from a location at which the first server computing element is located; and the second remote computing element is located at a second location which is different from the location at which the first server computing element is located.

18. The system of claim 17, wherein the first location is different from the second location.

19. The system of claim 17, wherein the first location is the same as the second location.

20. The system of claim 2, wherein:

the first charging profile comprises a first charging schedule; and the second charging profile comprises a second charging schedule.

21. The system of claim 20, wherein:

the first charging schedule comprises an identification of at least one of the discrete charging states at a first specific time or time range; and the second charging schedule comprises an identification of at least one of the discrete charging states at a second specific time or time range.

22. The system of claim 2, wherein each incentive signal comprises information indicative of a cost of electricity as a function of at least one of: (a) a time; and (b) a date.

23. A computer readable storage medium, tangibly embodying a program of instructions executable by the computer for distributed charging of at least one electrical asset, wherein each electrical asset has associated therewith a plurality of discrete charging states, the program of instructions, when executing, performing the following steps:

sending from a first server computing element to a first remote computing element associated with a first one of the at least one electrical assets at least one incentive signal; and calculating by the first remote computing element, based at least in part upon the incentive signal received by the first remote computing element, a first charging profile;

wherein the discrete charging states comprise: off; slow charge; and fast charge;

wherein the incentive signal comprises: a success probability associated with the slow charge; a success probability associated with the fast charge; a tariff that the first one of the at least one electrical assets would be charged if the slow charge was chosen; and a tariff that the first one of the at least one electrical assets would be charged if the fast charge was chosen; and wherein the calculation of the first charging profile is a discrete calculation that is based at least in part upon the success probabilities and tariffs of the incentive signal.

24. The computer readable storage medium of claim 23, wherein the program of instructions, when executing, performs the following steps:

sending from the first server computing element to a second remote computing element associated with a second one of the at least one electrical assets at least one incentive signal; and calculating by the second remote computing element, based at least in part upon the incentive signal received by the second remote computing element, a second charging profile;

wherein the calculation of the second charging profile is based at least in part upon the discrete charging states of the second one of the at least one electrical assets.

25. A method implemented in a computer system for distributed charging of at least one electrical asset, wherein each of the at least one electrical assets has associated therewith a plurality of discrete charging states, the method comprising:

sending from a first server computing element to a first remote computing element associated with a first one of the at least one electrical assets at least one incentive signal; and calculating by the first remote computing element, based at least in part upon the incentive signal received by the first remote computing element, a first charging profile;

wherein the discrete charging states comprise: off; slow charge; and fast charge;

wherein the incentive signal comprises: a success probability associated with the slow charge; a success probability associated with the fast charge; a tariff that the first one of the at least one electrical assets would be charged if the slow charge was chosen; and a tariff that the first one of the at least one electrical assets would be charged if the fast charge was chosen; and wherein the calculation of the first charging profile is a discrete calculation that is based at least in part upon the success probabilities and tariffs of the incentive signal.

26. The method of claim 25, further comprising:

sending from the first server computing element to a second remote computing element associated with a second one of the at least one electrical assets at least one incentive signal; and calculating by the second remote computing element, based at least in part upon the incentive signal received by the second remote computing element, a second charging profile;

wherein the calculation of the second charging profile is based at least in part upon the discrete charging states of the second one of the at least one electrical assets.

\* \* \* \* \*